(12) United States Patent
Baeder et al.

(10) Patent No.: US 9,843,493 B2
(45) Date of Patent: Dec. 12, 2017

(54) TEST-SOFTWARE-SUPPORTED MEASURING SYSTEM AND MEASURING METHOD

(71) Applicants: Uwe Baeder, Ottobrunn (DE); Holger Jauch, Munich (DE); Ingo Gruber, Munich (DE)

(72) Inventors: Uwe Baeder, Ottobrunn (DE); Holger Jauch, Munich (DE); Ingo Gruber, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 874 days.

(21) Appl. No.: 13/647,618

(22) Filed: Oct. 9, 2012

(65) Prior Publication Data

US 2013/0090885 A1    Apr. 11, 2013

(30) Foreign Application Priority Data

Oct. 7, 2011 (DE) .......................... 10 2011 084 143

(51) Int. Cl.
*G06F 19/00* (2011.01)
*H04L 12/26* (2006.01)
*H04L 12/24* (2006.01)

(52) U.S. Cl.
CPC .......... *H04L 43/14* (2013.01); *H04L 41/0803* (2013.01); *H04L 43/50* (2013.01)

(58) Field of Classification Search
CPC .. G01R 27/28; G01R 1/06772; G01R 35/005; G01R 31/2822; G06F 11/2294; G06F 11/3688; H04L 43/50; H04L 12/2697; H04W 24/06

USPC ....... 324/95, 537, 501, 615; 455/67.11, 423; 702/107, 69, 116
See application file for complete search history.

(56) References Cited

U.S. PATENT DOCUMENTS

| | | | |
|---|---|---|---|
| 6,025,708 A * | 2/2000 | Stickler | .................... 324/754.03 |
| 6,697,604 B1 | 2/2004 | Rimpelaet et al. | |
| 7,439,748 B2 * | 10/2008 | Kamitani | ...................... 324/601 |
| 8,000,656 B1 | 8/2011 | Jiao et al. | |
| 8,005,638 B1 * | 8/2011 | Mehta | ................ G01R 31/2868 702/116 |
| 8,433,953 B1 * | 4/2013 | Gaudette | ............... G06F 11/263 702/123 |
| 8,686,711 B2 * | 4/2014 | Tanaka et al. | ............. 324/76.39 |
| 2002/0046233 A1 | 4/2002 | Ganzert | |
| 2004/0207422 A1 * | 10/2004 | Lehtinen | ................ H04B 17/29 455/423 |

(Continued)

FOREIGN PATENT DOCUMENTS

DE    10050546 A1    7/2002

*Primary Examiner* — John Breene
*Assistant Examiner* — Jeffrey Aiello
(74) *Attorney, Agent, or Firm* — Ditthavong & Steiner, P.C.

(57) ABSTRACT

The measuring system comprises a measuring device and a device under test (9). This measuring device comprises a high-frequency processing unit (11), which is embodied to receive high-frequency signals from the device under test (9) and/or to transmit high-frequency signals to the device under test (9) via a first connection (5). The measuring system further comprises a test-software server unit (12), which is embodied to supply test-software to the device under test (9).

16 Claims, 5 Drawing Sheets

(56) References Cited

U.S. PATENT DOCUMENTS

| | | | |
|---|---|---|---|
| 2005/0171716 A1* | 8/2005 | Clarke | G01R 27/28 702/117 |
| 2005/0209878 A1* | 9/2005 | Fujino et al. | 705/1 |
| 2006/0128373 A1 | 6/2006 | Cochrane et al. | |
| 2006/0154610 A1 | 7/2006 | Rumney | |
| 2006/0235638 A1* | 10/2006 | Verspecht | 702/118 |
| 2006/0258293 A1* | 11/2006 | Steffen et al. | 455/67.11 |
| 2007/0021934 A1* | 1/2007 | Vohrer | 702/75 |
| 2007/0040561 A1* | 2/2007 | Kamitani | 324/601 |
| 2007/0207798 A1* | 9/2007 | Talozi | G06F 11/3688 455/423 |
| 2007/0266289 A1* | 11/2007 | Yang | G06F 11/2294 714/742 |
| 2008/0271387 A1* | 11/2008 | Fritzel et al. | 52/80.1 |
| 2008/0293363 A1 | 11/2008 | Olgaard | |
| 2009/0153332 A1* | 6/2009 | Dokai et al. | 340/572.1 |
| 2010/0081375 A1 | 4/2010 | Rosenblatt et al. | |
| 2011/0148492 A1* | 6/2011 | Akita | 327/163 |
| 2011/0238349 A1* | 9/2011 | Diepenbrock et al. | 702/69 |
| 2012/0209470 A1* | 8/2012 | Gilbert et al. | 701/31.4 |
| 2012/0306544 A1* | 12/2012 | Liu | 327/108 |
| 2013/0054170 A1* | 2/2013 | Sobajic | G06F 11/2294 702/82 |
| 2015/0111506 A1* | 4/2015 | Franke et al. | 455/67.14 |

\* cited by examiner

TEST-SOFTWARE-SUPPORTED MEASURING SYSTEM AND MEASURING METHOD

The invention relates to a measuring system and a measuring method, which use software to be installed on the device under test to support the measurement.

A measuring device which transmits signals via a high-frequency interface to the device under test and receives signals from the device under test is conventionally used in order to measure a device under test, such as a mobile telephone. To cause the device under test to generate the signals to be transmitted and to process the signals received, it is conventionally connected via an additional interface to the measuring device or an external control computer. This represents a considerable cost. Moreover, with external control instructions, access cannot be gained to every required function of the device under test.

Furthermore, a measuring system which comprises several measuring devices connected to one another, is known from the German Patent DE 100 50 546 B4. In this context, updates of the control software for the individual measuring devices can be transmitted from one measuring device to further measuring devices in the measuring system.

The invention is based upon the object of providing a measuring system and a measuring device, which allow a simple and accurate measurement of a device under test.

The object is achieved according to the invention for the device by the features of the independent claim 1 and for the method by the features of the independent claim 10.

Advantageous further developments form the subject matter of the dependent claims relating back to these claims.

A measuring system according to the invention comprises a measuring device and a device under test. The measuring device provides a high-frequency processing unit, which is embodied to receive high-frequency signals from the device under test and/or to transmit high-frequency signals to the device under test via a first connection. Furthermore, the measuring system comprises a test-software server unit, which is embodied to supply test-software to the device under test. Accordingly, it is possible to implement complex measurement tasks at a minimum cost through the cooperation of the device under test.

The measuring system preferably further comprises a control computer which is connected to the device under test. The control computer is preferably embodied to transmit data to the device under test and to receive data from the device under test. In this case, the test-software causes the device under test to transmit received data via the first connection to the measuring device and to transmit signals received via the first connection to the control computer as data. In this manner, a standard measuring device can be used in the measuring system.

By preference, the measuring system further comprises a test-software information unit, which is embodied to inform the device under test regarding the availability of test-software. Accordingly, the test-software can be installed at minimal cost.

In the next section, the invention will be described by way of example on the basis of the drawings, which show an advantageous exemplary embodiment of the invention. The drawings are as follows.

Initially, the overall structure and method of functioning of a first exemplary embodiment of the measuring system according to the invention are explained with reference to FIG. 1.

Following this, the structure and method of functioning of different exemplary embodiments of the measuring system according to the invention are explained in greater detail with reference to FIGS. 2-4. Following this, the method of functioning of the exemplary embodiment of the measuring method according to the invention is then explained with reference to FIG. 5. The presentation and description of identical elements in similar drawings have not been repeated in some cases.

Figure 1:
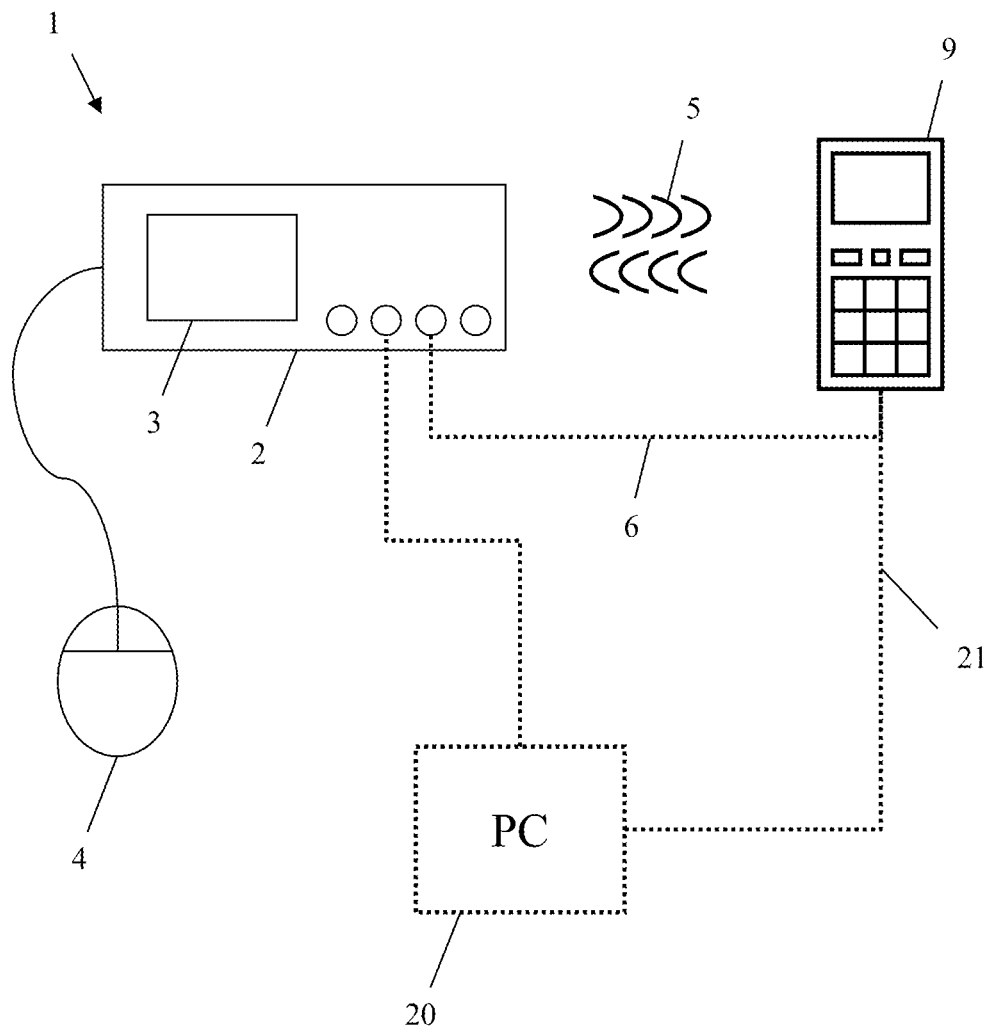
FIG. 1 shows a block-circuit diagram of a first exemplary embodiment of the measuring system according to the invention.

FIG. 1 illustrates a first exemplary embodiment of the measuring system according to the invention. This measuring system comprises a measuring device 1, a control computer 20 and a device under test 9. The device under test is the device to be measured and at the same time a part of the measuring system.

The measuring device 1 comprises a housing 2, a display device 3 and an operating unit 4. The preferably wireless measuring device 1 is connected via an HF-(high-frequency) connection 5 and a data connection 6 to the device under test 9. Furthermore, the measuring device 1 is connected to the control computer 20. The latter is also connected to the device under test via a data connection 21.

In this context, the data connection 6 and the control computer 20 are alternatives. The measuring system according to the invention is also functional if only a high-frequency connection 5 is provided between the measuring device 1 and the device under test 2 and a data connection 6 or a data connection 21 to a control computer 20.

The measuring system provides a test-software which is installed and activated by the device under test 9. The test-software causes the device under test to perform given measurement tasks in cooperation with the measuring device 1. Accordingly, the test-software can cause the device under test to transmit high-frequency signals via the HF connection 5 to the measuring device 1. The test-software can also cause the device under test to receive high-frequency signals from the measuring device 1 and to process the latter in a given manner. Moreover, the software can set the device under test 9 into a predetermined configuration. Beyond this, the test-software can also cause the device under test 9 to read out data stored in the device under test 9 and to transmit this to the measuring device 1 via the high-frequency connection 5 or the data connection 6. Numerous other measurement tasks are also conceivable.

If the control computer is used in the case of an exemplary measurement task, it transmits data via the data connection 21 to the device under test 9, which converts the data into an HF (high-frequency) signal and transmits it to the measuring device via the HF connection 5. On the basis of the data received, a data-throughput measurement can be implemented, for example. Alternatively, the control computer can also implement measurements in the reverse direction. In this case, the measuring device 1 transmits an HF signal to the device under test 9 via the HF connection 5. This receives the signal, processes it and transmits the resulting data to the control computer via the data connection 21.

The control computer 20 preferably also controls the function of the measuring device 1. The control computer 20 can be an independent computer or integrated in the measuring device 1. The test-software makes a data interface, in this case on the device under test 9, available as an application (app), by means of which the data can be received and processed. This interface can be, for example, an ftp-client, an http-client, a PING-application or an iperf tcp client/server. More than one of the interfaces named above are also conceivable.

In particular, the test-software can make a browser available to the device under test. This browser performs tasks identical to those of a native application provided in the operating system of the device under test 9. Accordingly, under the control of the control computer 20, the browser generates data traffic between the device under test 9 and the measuring device 1, such as would be available with the operation of a conventional browser by a user of the device under test 9.

Moreover, the test-software provides an authentication. Accordingly, only an authorised control computer 20 can set up the connection with the test-software.

If no control computer is used, the entire communication takes place between the measuring device 1 and the device under test 9. In this case, the measuring device 1 assumes all of the functions of the control computer.

The device under test 9 in this case is, for example, a mobile telephone. The measuring device 1 is then a base-station emulator.

Figure 2:
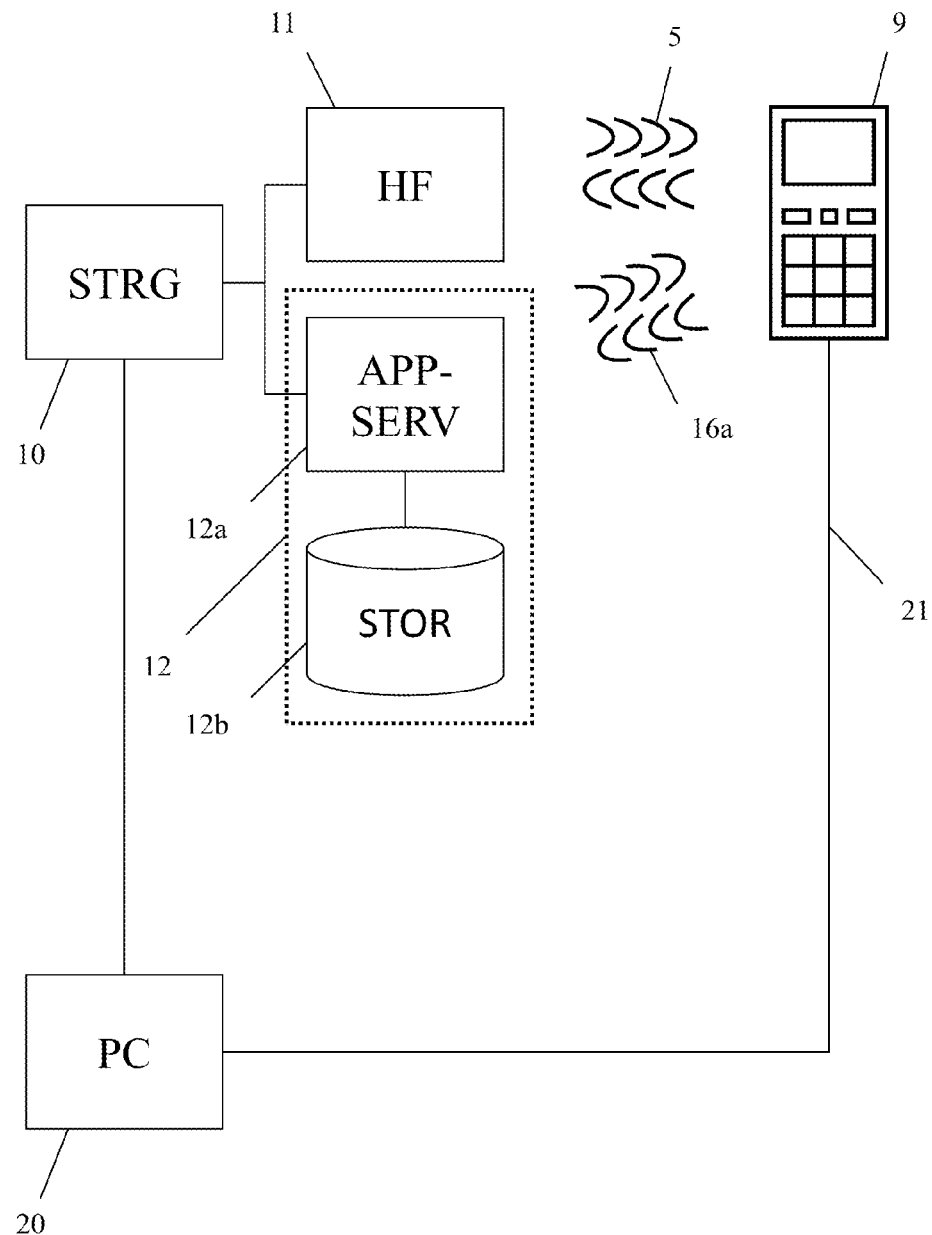
FIG. 2 shows a block-circuit diagram of a second exemplary embodiment of the measuring system according to the invention.

FIG. 2 illustrates a second exemplary embodiment of the measuring system according to the invention. Only internal functional blocks of the measuring device 1 from FIG. 1, the control computer 20 and the device under test 9, are illustrated here. The measuring device 1 from FIG. 1 contains a control unit 10, a high-frequency processing unit 11 and a test-software server unit 12. This test-software server unit 12 contains a test-software processing unit 12a and a test-software memory unit 12b.

The device under test 9 is connected via the HF connection 5 to the high-frequency processing unit 11. The device under test 9 is connected to the test-software server unit 12 via an additional HF connection 16a. This HF connection 16a is provided between the test-software processing unit 12a of the test-software server unit 12 and the device under test 9.

The test-software processing unit 12a supplies test-software to the device under test 9, which is stored in the test-software memory unit 12b. In this context, the test-software is transmitted by the test-software memory unit 12b to the test-software processing unit 12a and from there via the HF connection 16a to the device under test 9. This test-software is installed and activated by the device under test 9. The test-software causes the device under test 9 to carry out predetermined measurement tasks in cooperation with the high-frequency processing unit 11.

The control unit 10 of the measuring device is further connected to a control computer 20. The control computer 20 is connected to the device under test 9 via a data connection 21. Accordingly, the control computer 20 is connected to the device under test 9 by means of the test-software.

The control computer 20 transmits data to the device under test 9 which is then processed and evaluated by the test-software. This data is transmitted to the high-frequency processing unit 11 of the measuring device by the device under test 9 via the HF connection 5. The high-frequency processing unit 11 receives the signals via the HF connection 5 and generates from them data, which is rerouted to the control unit 10. In the opposite direction, the control computer 20 transmits data to the control unit 10 of the measuring device. This converts the data by means of the high-frequency processing unit 11 into an HF signal and transmits it by means of the high-frequency connection 5 to the device under test 9. The latter receives the HF signal, determines data from it and transmits this via the data connection 21 to the control computer 20.

On the basis of this data, the control unit 10 determines parameters of the device under test 9 to be checked. These include, for example, a data-throughput measurement. In this context, the HF connections 5 and 16a need not be implemented via an air interface, but can also be provided via an HF (high-frequency) line.

Figure 3:
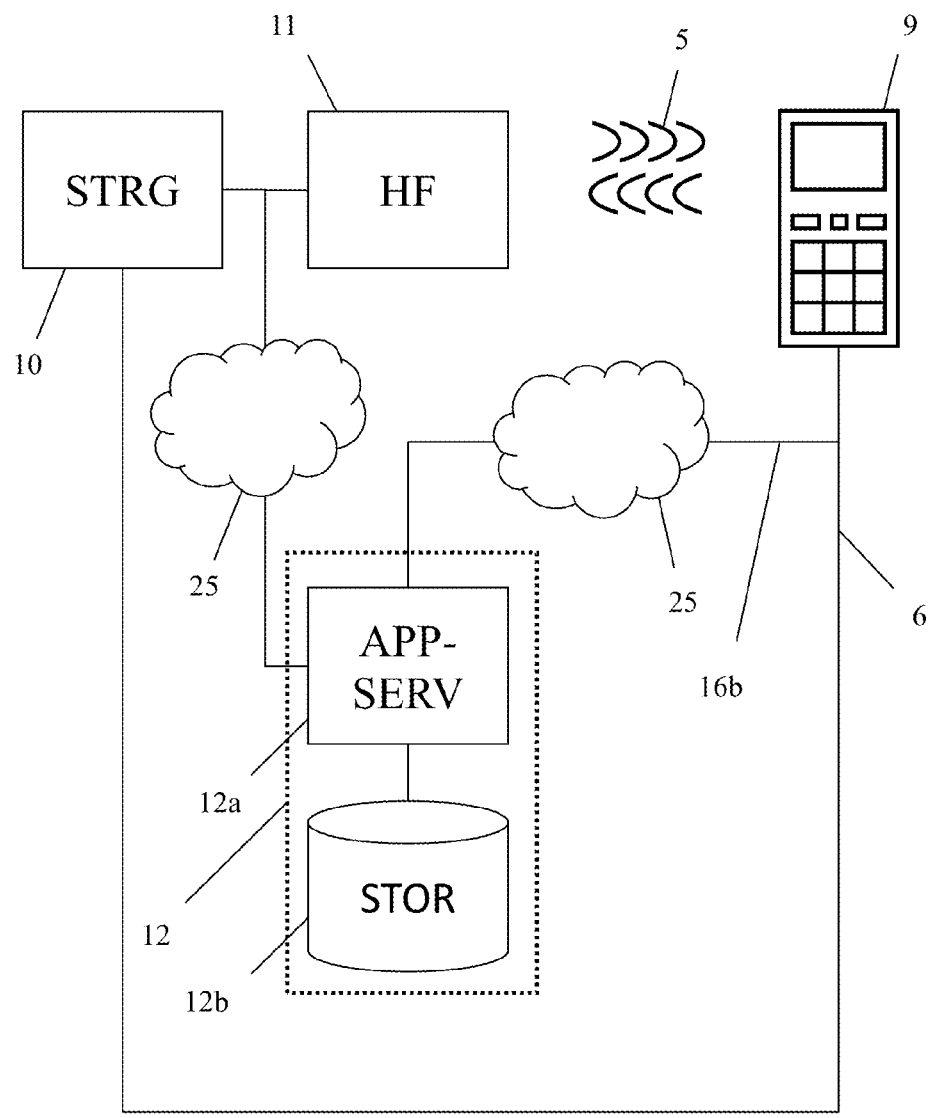
FIG. 3 shows a block-circuit diagram of a third exemplary embodiment of the measuring system according to the invention.

FIG. 3 shows a third exemplary embodiment of the measuring system according to the invention. Here, the test-software server unit 12 is not a part of the measuring device. The test-software server unit 12 is only connected to the device under test 9 via a network 25. The network 25 can be, for example, the Internet. Optionally, the test-software server unit 12 is additionally connected to the control unit 10 by means of the network 25. Only one connection to the control unit 10 is illustrated here. In this manner, the control unit 10 can transmit the necessary test-software to the test-software server unit.

By contrast with the measurement system from FIG. 2, the transmission of the test-software here is not implemented via an HF connection 16a but through the network 25 via a connection 16b. In this case, the measurement system does not have a control computer at its disposal. Instead, the data connection 6 to the measuring device 1 is provided directly.

Figure 4:
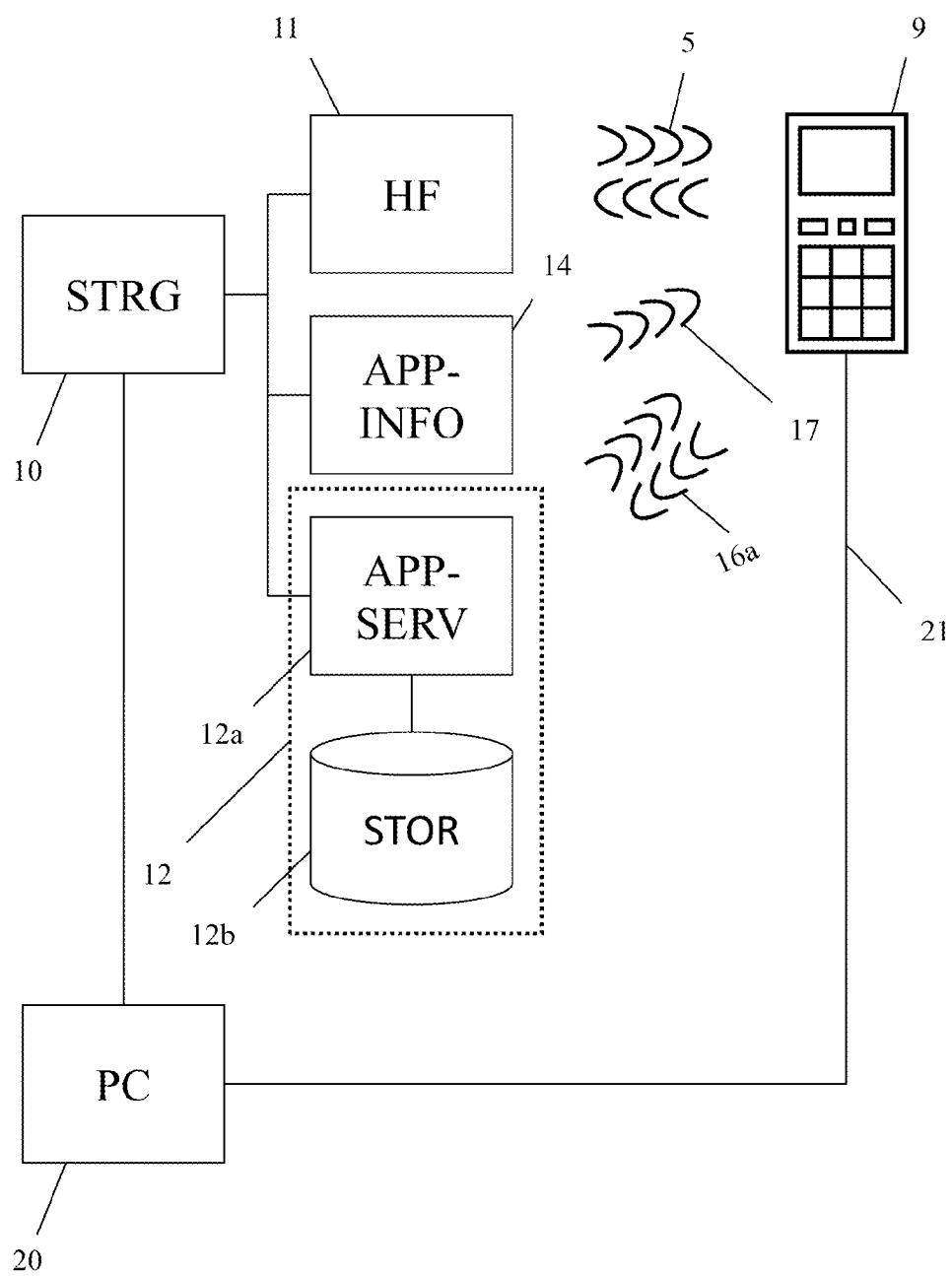
FIG. 4 shows a block-circuit diagram of a fourth exemplary embodiment of the measuring system according to the invention.

FIG. 4 illustrates a fourth exemplary embodiment of the measuring system according to the invention. Here, the measuring system additionally contains a test-software information unit 14. This informs the device under test 9 via a connection 17 that test-software is available, which is to be used by the device under test. In this context, the test-software information unit 14 can contain a near field communication unit (near field communication), which transmits a signal, which refers to the availability of test-software. A near field communication unit (near field communication) inside the device under test 9 receives this signal and infers from it that test-software is available. Accordingly, the device under test 9 takes up contact with the test-software server unit 12 via the HF connection 16a, loads the test-software, installs and activates it.

As an alternative, the test-software information unit can also contain a display device, on which the reference regarding the availability of test-software is displayed. This display unit can be the display unit 3 of the measuring device 1 from FIG. 1. The reference is preferably displayed in the form of a barcode or, by particular preference, in the form of a two-dimensional matrix code. The device under test 9 in this case contains a camera, with which this reference is registered. The content of the reference is determined automatically. On the basis of this reference, the device under test now resumes contact with the test-software server unit 12 in order to receive the test-software.

As a third alternative, the test-software information unit 14 can also contain a SIM card, which is arranged in the device under test. This alternative is not illustrated here. This SIM card is a special test SIM card. As soon as the device under test 9 is activated, it accesses the SIM card and receives from it a reference regarding the availability of test-software.

In this case, the reference regarding the availability of test-software provides an indication for each of the alternatives for how the device under test 9 can obtain the test-software. This can be, for example, the storage location of the test-software. The authentication of the device under test 9 described with reference to FIG. 1 can also be processed by means of the SIM card.

Figure 5:
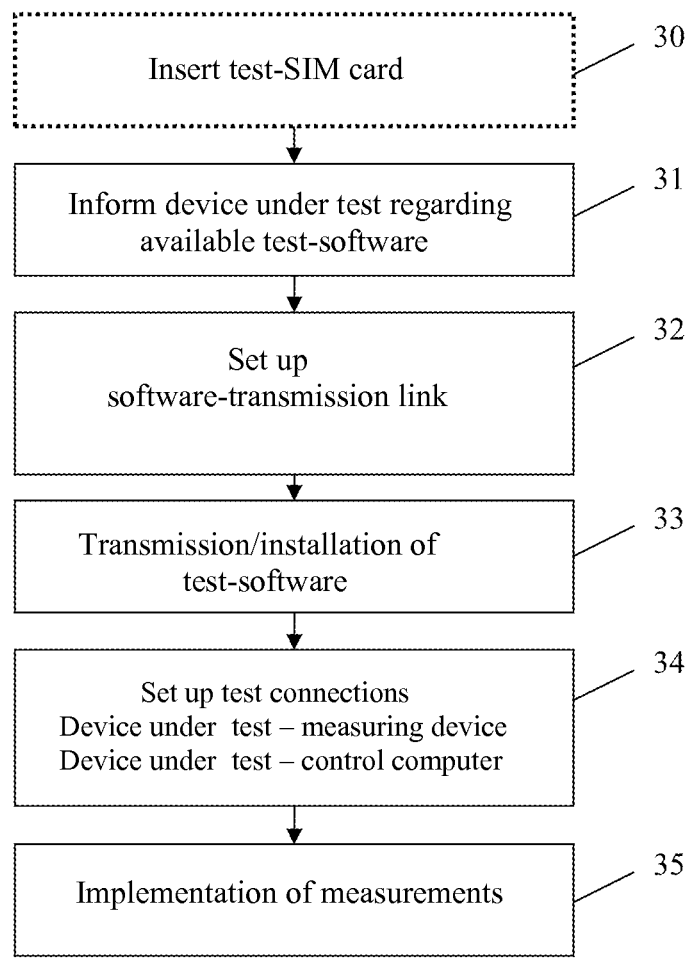
FIG. 5 shows a flow chart of an exemplary embodiment of the measuring method according to the invention.

FIG. 5 finally shows an exemplary embodiment of the measuring method according to the invention. In an optional first step 30, a special SIM card, a test-SIM-card, is inserted into the device under test. In a second step 31, the device under test is informed regarding the availability of test-software. In a third step 32, a software transmission link is set up between the device under test and the memory location of the test-software. This memory location can be either the measuring device or an external server, for example, in the Internet. This memory location corresponds to the test-software server unit 12 in the measuring system according to the invention.

In a fourth step 33, the test-software is transmitted to the device under test, installed and activated by the latter. In a fifth step 34, the connections from the device under test to the measuring device and from the device under test to a control computer are set up. However, in this context, the connection to the control computer is merely optional. A measurement exclusively by means of the measuring device is also conceivable. In a sixth step 35, measurements are now implemented via the connections established. For example, the data is transmitted from the control computer to the device under test. The device under test generates a high-frequency signal from the data and transmits this to the measuring device. The measuring device receives the high-frequency signal, determines data from it, and from this determines parameters which characterise the device under test. For example, a data-throughput measurement can be implemented in this manner.

The invention is not restricted to the exemplary embodiment presented. Accordingly, an extremely diverse range of devices under test can be tested. A use of an extremely diverse range of communications standards, such as UMTS, LTE, GSM, WIMAX etc is also conceivable. All of the features described above or illustrated in the drawings can be advantageously combined with one another as required within the scope of the invention.

The invention claimed is:

1. A measuring system comprising:
a measuring device and a device under test,
wherein the measuring device provides a high-frequency processing unit,
wherein the high-frequency processing unit is embodied to receive high-frequency signals from the device under test and/or to transmit high-frequency signals to the device under test via a first connection,
wherein the measuring system further comprises a test-software server unit, which is embodied to supply test-software to the device under test,
wherein the test-software causes the device under test to:
transmit high-frequency signals to the high-frequency processing unit, and/or
receive high-frequency signals from the high-frequency processing unit and to process the latter, and/or
adopt a configuration specified by the measuring device, and/or
read out data stored in the device under test,
wherein the test software is configured to make a browser available to the device under test generating data traffic between the device under test and the measuring device, such as it would be available with an operation of a conventional browser by a user of the device under test, and
wherein a test SIM card is arranged in the device under test, that authenticates the device under test.

2. The measuring system according to claim 1, wherein:
the measuring system further comprises a control computer, which is connected to the device under test,
that the control computer is embodied to transmit data to the device under test and to receive data from the device under test, and
that the test-software causes the device under test to transmit received data to the measuring device via the first connection and to transmit received signals to the control computer via the first connection as data.

3. The measuring system according to claim 1, wherein the test-software server unit is a component of the measuring device or is connected to the measuring device via a network.

4. The measuring system according to claim 3, wherein the test-software server unit is connected to the measuring device via the Internet.

5. The measuring system according to claim 1, wherein:
the test-software server unit is connected to the device under test via a second connection, and
that the second connection is not identical to the first connection.

6. The measuring system according to claim 1, wherein:
the measuring system further comprises a test-software information unit, and
that the test-software information unit is embodied to inform the device under test regarding the availability of test-software.

7. The measuring system according to claim 6, wherein:
the device under test provides a near-field communication unit (Near Field Communication), and
that the test-software information unit contains a near-field communication unit (Near Field Communication).

8. The measuring system according to claim 6, wherein the device under test provides a camera, and that the test-software information unit contains a display unit, which displays a reference regarding available test-software in a manner readable by the camera of the device under test.

9. The measuring system according to claim 8, wherein the reference comprises a one-dimensional barcode or two-dimensional matrix code.

10. The measuring system according to claim 6, wherein:
the test-software information unit contains a SIM card, which is arranged in the device under test,
that, upon activation, the SIM card is embodied to instruct the device under test regarding the presence of test-software,
that the SIM card is a test-SIM card, and
that the device under test is embodied to activate the test-software only when the SIM card is inserted.

11. A method for measuring a device under test, the method comprising:
receiving high-frequency signals from the device under test and/or transmitting high-frequency signals to the device under test,
wherein the device under test is supplied with test-software, which causes the device under test to perform measuring tasks, wherein the test-software causes the device under test to:
  transmit high-frequency signals, and/or
  receive high-frequency signals and to process the latter, and/or
  adopt a specified configuration, and/or
  read out data stored in the device under test,
wherein the test software is configured to make a browser available to the device under test generating data traffic between the device under test and the measuring device, such as it would be available with an operation of a conventional browser by a user of the device under test, and
wherein a test SIM card is arranged in the device under test, that authenticates the device under test.

12. The method according to claim 11, wherein the device under test is informed regarding the availability of test-software.

13. The method according to claim 12, wherein the device under test is informed regarding the availability of test-software by means of the near-field communication unit (Near Field Communication).

14. The method according to claim 12, wherein:
the device under test is informed regarding the availability of test-software by means of a reference displayed on a display device, and
that the reference is registered by the device under test by means of a camera.

15. The method according to claim 14, wherein the reference comprises a one-dimensional barcode or two-dimensional matrix code.

16. The method according to claim 12, wherein:
a SIM card is arranged in the device under test,
that, upon its activation of the SIM card, the device under test is instructed regarding the presence of test-software,
that the SIM card is a test-SIM card, and
that the test-software is activated only when the SIM card is inserted.

* * * * *